Patented May 19, 1942

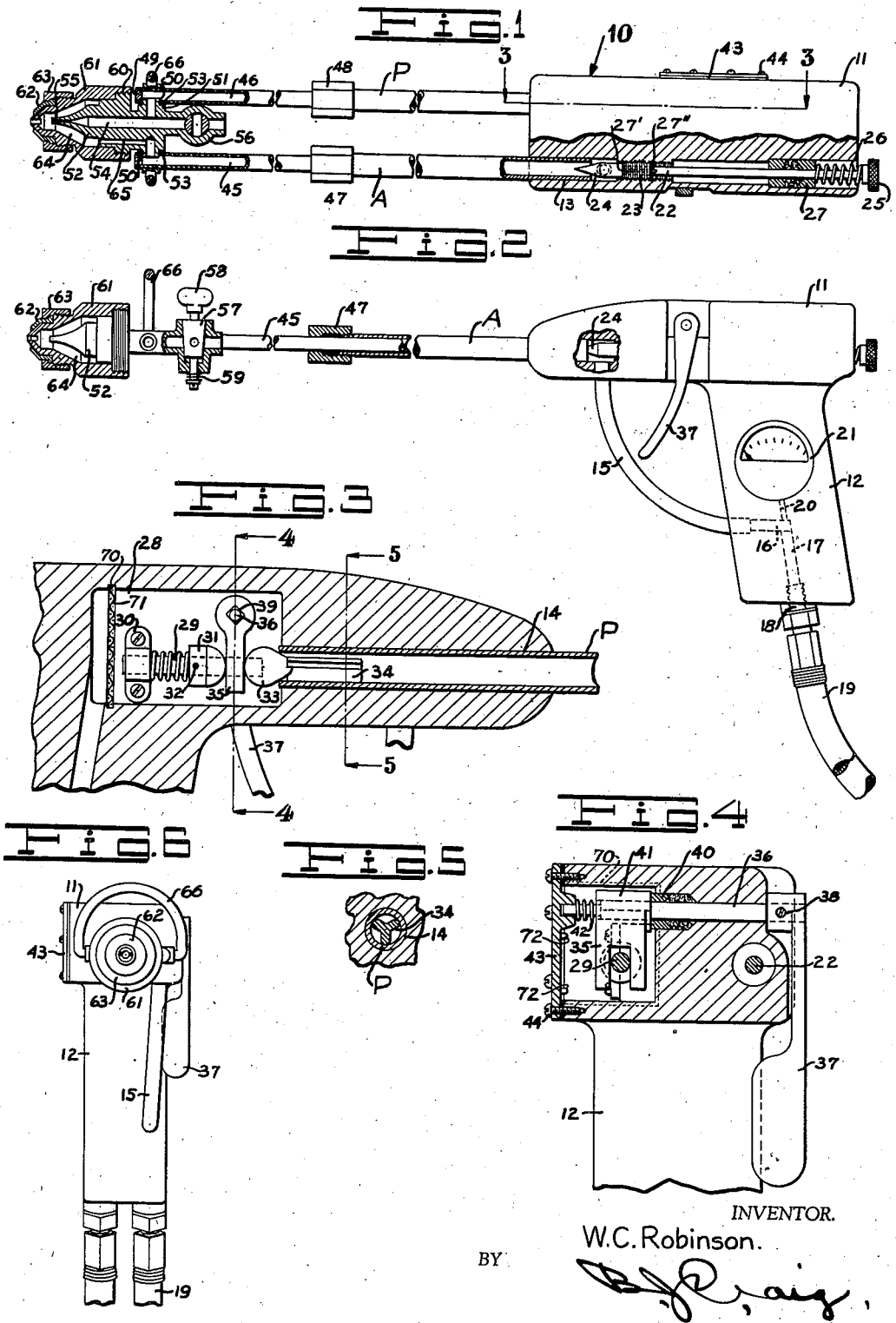

2,283,762

UNITED STATES PATENT OFFICE 2,283,762

PAINT SPRAY NOZZLE

William C. Robinson, Bell, Calif.

Application July 11, 1941, Serial No. 401,927

6 Claims. (Cl. 299—140)

This invention relates to paint spray nozzles.

The general objective of the invention is to provide an improved nozzle which is particularly adapted for use with paint guns or for similar purposes.

A more specific object of the invention is to provide a paint spray nozzle including novel means permitting obstructions in the nozzle to be removed.

Another objective of the invention is to provide a novel telescopically mounted spray gun nozzle.

Another objective of the invention is to provide a novel control means for the conduit of a paint spray nozzle.

An additional object of my invention is to provide a novel mounting for a paint spray nozzle.

Other objects and advantages of the invention will be apparent from the following description taken in connection with the accompanying drawing, wherein:

Fig. 1 is a top plan view partly in section showing my invention;

Fig. 2 is a side elevation partly in section showing the invention;

Fig. 3 is a fragmentary section taken on line 3—3, Fig. 1;

Fig. 4 is a section taken on line 4—4, Fig. 3;

Fig. 5 is a fragmentary section taken on line 5—5, Fig. 3; and

Fig. 6 is a front elevation showing my improved nozzle.

Referring to the drawing by reference characters I have shown my invention as embodied in a paint spray nozzle which is indicated generally at 10. As shown the nozzle includes a body 11 having a hand grip 12 integral therewith. The body is provided with a pair of parallel bores 13 and 14 in which conduit pipes A and P are mounted. The conduit pipe A conducts compressed air and the conduit P conducts paint.

The air bore 13 at its inner end communicates with a curved pipe 15 which communicates with a bore 16 in the grip 12. The bore 16 communicates with a bore 17 connected by a nipple 18 with an air hose 19. The bore 17 communicates with a reduced bore 20 which communicates with an air pressure gage 21 which is set in the grip member 12. The gage 21 registers the pressure of air from the hose 19. Passage into the air pipe 14 is controlled by a valve member 22 which slides through a bushing 23 the latter being threaded into the bore 13. The valve member 22 includes a tapered valve 24 which engages the end of the air conduit 13. The valve member 22 includes an operating portion 25. The valve member is normally urged away from its seat by a spring 26 which engages the member 25 and also engages packing members 27. These members 27 serve to prevent leakage of compressed air. A shoulder 27' on the valve engages the end of the bushing. A key and slot connection 27" permits shifting the bushing by rotating the rod 22.

The paint conduit P communicates at its inner end with an enlarged chamber 28. Within this chamber I mount a valve member 29 which is slidable in a bracket 30. The valve member includes a head 31 held in place by a pin 32 and a valve 33 which may be secured in place as by welding. The valve 33 engages the end of the paint tube P and is provided with a protuberant Y-shaped extremity 34 which slides in the tube P as shown in Figs. 3 and 5 and serves to guide the valve. The members 31 and 33 are spaced apart and between them receive an arm 35 which is mounted on a rotatable rod 36.

A trigger 37 is mounted on the outer end of the rod, being held in place as by a pin 38. As shown the arm 35 has a rectangular aperture 39 and is prevented from turning relative to the rod 36 by a rectangular upturned, intermediate, portion on the rod 36 which fits into the aperture 39. A packing member 40 engages the rod 36 and serves as a seal by its engagement with a cylindrical portion 41 on the arm 35. A spring 42 normally urges the arm 35 to the right in Fig. 4. The chamber 28 is closed by a cover 43 which is held in place by screws 44.

The pipes A and P slidably receive extension pipes 45 and 46 respectively. Leakage is prevented by packing members 47 and 48 which engage the pipes 45 and 46. The pipes 45 and 46 are disposed in parallel relation and their outer ends are closed by plugs 49. Each of the pipes is provided with a lateral aperture 50. These apertures 50 are arranged on the inner faces of the pipes and are aligned to receive the outer ends of cylindrical bosses 51 on a nozzle member 52. Suitable gaskets 53 serve to prevent leakage from the bosses.

The nozzle 52 includes a body having a central bore 54 with a tapered discharge forward end 55 and with the rear end including an enlargement 56 in which a plug valve 57 is mounted. The plug valve 57 includes an operating portion 58 and is held to its seat by a spring 59. When the valve is turned to the position shown in Fig. 1, passage rearwardly through the bore 54 is obstructed, and when the valve is turned through 90° from Fig. 1 the end of the bore 54 is open to the atmosphere. The bore 54 communicates with the pipe P and conveys paint to the outlet 55.

The nozzle 52 includes a threaded portion 60 on which a cap 61 is mounted. This cap includes a discharge member 62 which is held in place by a threaded collar 63. Between the nozzle 55 and the adjacent wall of the cap I provide a chamber 64 which opens into the discharge member 62 at one end and at the other end communicates with conduit 65 which in turn communicates with the pipe 45. The pipes 45 and 46 are urged against the bosses 50 by a U-shaped spring loop 66 best shown in Fig. 6.

In operation, the valve 24 is regulated, permitting compressed air to escape through pipe A, chamber 64 and out through the end of the nozzle. The trigger 37 is then operated to permit the flow of paint through the pipe P, into the base 54 and through the discharge end 55 where it mixes with the stream of air thus forming a spray.

Should any material become lodged in the bore 54 or the discharge end 55 and impair the flow of paint, the operator may release the trigger, thus shutting off the paint flow. He may then open the plug valve 57 and place his finger against the front of the discharge member to close the opening therein, whereupon the compressed air will flow back through the bore 54 and the valve 57 and out the rear of the nozzle and carry with it the material which impaired the flow of paint. This operation permits ready cleaning of the nozzle and thus avoids delay.

With the telescopically mounted nozzle the operator can have full control of the painting operation and can reach what would otherwise be inaccessible locations.

In order to provide a strainer I show the walls of the chamber 28 as provided with a groove 70 in which a screen 71 is slidably inserted. The cover 43 holds the screen in place. Spaced lugs 72 on the cover are arranged on each side of the screen. The screen 71 is readily removable so that screens of different mesh may be inserted.

From the foregoing description it will be apparent that I have invented a novel spray nozzle which can be economically manufactured and which is highly efficient for its intended purpose.

Having thus described my invention, I claim:

1. In a paint spray nozzle, a body, an air tube on the body, a paint tube on the body, said body having a chamber therein, a valve in said chamber for controlling communication through the paint tube, a rotatable rod passing through said chamber, an arm on the rod, said arm engaging said valve, a trigger member on the rod, packing means engaging the rod, said arm having an enlarged portion engaging said packing means, and spring means urging said enlarged portion against said packing means.

2. In a spray nozzle, a body, a pair of conduits on said body, a tube slidably mounted on each conduit, said tubes being parallel and adjacent to each other, said tubes having aligned apertures, a nozzle member having opposed bosses arranged in said apertures, each of said pipes having an ear secured upon the outer surface thereof and a U-shaped spring clip member having its ends engaging said ears to urge the tubes towards the nozzle bosses.

3. In a spray nozzle, a body, a pair of conduits on said body, a tube slidably mounted on each conduit, each tube communicating with its associated conduit, said tubes being parallel and adjacent to each other, said tubes having aligned apertures, a nozzle member including a body having opposed bosses arranged in said apertures, each of said pipes having thereon a U-shaped spring clip member having its ends engaging said ears to urge the tubes towards the nozzle bosses, said nozzle member having a bore therethrough, one of said bosses having a hole therethrough affording communication between the associated one of the tubes and the nozzle member bore, said nozzle including a discharge end, the nozzle member bore communicating with the discharge end forwardly of the bore, a clean-out valve on the nozzle member, said clean-out valve being located in the rearward section of the bore and normally closing passage rearwardly through the bore, a cap on said nozzle, a discharge member on the cap, said cap being spaced from the nozzle member, and conduit means extending through said nozzle member body and the other boss and affording communication between the interior of the cap and the other one of said tubes.

4. In a spray nozzle, a body, a pair of conduits on said body, a tube slidably mounted in each of said conduits, each tube communicating with its associated conduit, said tubes being parallel and adjacent to each other, said tubes having aligned apertures and a nozzle member including a body having opposed bosses arranged in said aperture, said nozzle member having a bore therethrough, one of said bosses having a hole therethrough affording communication between the nozzle member bore and the associated one of the tubes, said nozzle including a discharge end, a cap on said nozzle, the nozzle member bore communicating with the discharge end forwardly of the bore, a clean-out valve on the nozzle member, said clean-out valve being located in the rearward section of the bore and normally closing passage rearwardly through the bore, and conduit means in said nozzle member and in the other bore and affording communication between the other tube and the interior of the cap.

5. In a spray nozzle, an elongated body having a hand grip thereon, said body having a pair of bores therein, a conduit pipe in each bore, an extension pipe slidably received in each of said conduit pipes, and communicating with each of said last mentioned pipes having a lateral aperture therein and having a closed end, a nozzle member including a body having bosses thereon fitting said apertures, said nozzle member having a bore with a discharge portion at the forward end thereof, said bore having a clean-out valve at the rear end thereof, a discharge member on said nozzle and spaced at least in part from the nozzle to form a chamber, said discharge member having an outlet spaced from said bore discharge portion, one of said bosses having a hole therethrough affording communication between the associated extension pipe and said nozzle member bore, conduit means in said nozzle member body and in the other boss affording communication between the other extension pipe and the chamber, means to conduct liquid to one of said conduit pipes and means to conduct compressed air to the other conduit pipe.

6. In a spray nozzle, an elongated body having a depending hand grip integral therewith, said body having a pair of bores therein, a conduit pipe in each bore, said conduit pipes each terminating at one end within the body and at the other end projecting beyond the body, an extension pipe slidably received in each of said conduit pipes, each of said extension pipes having a lateral aperture therein and having a closed end, a nozzle member having bosses thereon fitting said apertures, said nozzle member having a bore therethrough, said bore having a discharge portion at the forward end thereof, said bore having a clean-out valve at the rear end thereof, one of said bosses having a hole therethrough affording communication between one of said extension pipes and the bore, said nozzle member having an auxiliary bore parallel to the first bore, said second boss having an aperture affording communication between the auxiliary bore and the second extension pipe, a discharge member on said nozzle and spaced at least in part from the nozzle, said discharge member having an outlet spaced from said bore discharge portion, said auxiliary bore communicating with the space between said nozzle member and said discharge member, means to conduct liquid to one of said conduit pipes and means to conduct compressed air to the other conduit pipe.

WILLIAM C. ROBINSON.